July 10, 1951 M. R. WINKLER 2,560,320

RADIO TRANSMITTER-RECEIVER INCLUDING SHIELDING CHASSIS AND PLUG-IN STAGES

Filed June 16, 1948 7 Sheets-Sheet 1

INVENTOR.
Marion R. Winkler,
BY
Foorman L. Mueller
Atty.

July 10, 1951

M. R. WINKLER 2,560,320

RADIO TRANSMITTER-RECEIVER INCLUDING SHIELDING CHASSIS AND PLUG-IN STAGES

Filed June 16, 1948

7 Sheets-Sheet 2

INVENTOR.

Marion R. Winkler

BY

Foorman L. Mueller

Atty.

July 10, 1951 M. R. WINKLER 2,560,320

RADIO TRANSMITTER-RECEIVER INCLUDING SHIELDING CHASSIS AND PLUG-IN STAGES

Filed June 16, 1948 7 Sheets-Sheet 3

INVENTOR.
Marion R. Winkler,
BY
Foorman L. Mueller
Atty.

INVENTOR.
Marion R. Winkler,
BY
Foorman L. Mueller
Atty.

July 10, 1951 M. R. WINKLER 2,560,320

RADIO TRANSMITTER-RECEIVER INCLUDING SHIELDING CHASSIS AND PLUG-IN STAGES

Filed June 16, 1948 7 Sheets-Sheet 5

INVENTOR.
Marion R. Winkler,
BY
Foorman L. Mueller
Atty.

INVENTOR.
Marion R. Winkler,
BY
Forman L. Mueller
Atty.

July 10, 1951 M. R. WINKLER 2,560,320

RADIO TRANSMITTER-RECEIVER INCLUDING SHIELDING CHASSIS AND PLUG-IN STAGES

Filed June 16, 1948 7 Sheets-Sheet 7

INVENTOR.
Marion R. Winkler,
BY
Foorman L. Mueller
Atty.

Patented July 10, 1951

2,560,320

UNITED STATES PATENT OFFICE 2,560,320

RADIO TRANSMITTER-RECEIVER, INCLUDING SHIELDING CHASSIS AND PLUG-IN STAGES

Marion R. Winkler, La Grange Park, Ill., assignor to Motorola, Inc., Chicago, Ill., a corporation of Illinois Application June 16, 1948, Serial No. 33,403

21 Claims. (Cl. 250—16)

This invention relates to radio transmitting and receiving instruments of small size, and particularly, though not exclusively, to portable transmitter-receivers.

There is a demand for a portable transmitter-receiver having a very high gain and which is not heavy or bulky. One of the difficulties encountered in designing high-gain transmitter-receivers, especially those of small size, is the acute shielding problem. Because of this, there has been a tendency to regard compactness and adequate shielding as being inconsistent factors, one or the other of which must be sacrificed to some extent in constructing this type of equipment. Another serious problem has been the difficulty of servicing small, compact radio sets. Still other undesirable features, not specifically enumerated above, have been involved in the manufacture and use of small transmitter-receivers as they generally are constructed.

An object of this invention is to provide an improved high-gain, small, transmitter-receiver which is free of the aforesaid disadvantages.

A further object is to provide a transmitter-receiver having a novel arrangement of stages which are compactly built and well shielded from one another, affording a general-purpose instrument of extremely small size and light weight.

A still further object is to provide an improved transmitter-receiver having a cellular chassis with plug-in units or stages that can readily be withdrawn for servicing or inspection and which are effectively isolated from each other, each in its own cell, when installed in the equipment.

A still further object is to provide a novel and economical high-gain communication set adapted to be carried by a person and having all the essential and desirable features of portable transmitter-receivers as heretofore constructed.

A feature of the invention is the provision of a honeycomb chassis structure adapted to house the various stages of the transmitter-receiver whereby each stage is properly shielded from the other stages. The chassis structure is formed of highly conductive metal and provides in effect a plurality of tubular cells. The cells provide barriers to prevent direct electromagnetic and electrostatic coupling between stages. The cells also form wave guides and the dimensions of the cells are so related to the frequencies involved that a large amount of attenuation is provided thereby. The components which produce most undesirable radiation are so positioned in the cells to take maximum advantage of the wave guide attenuation.

A further feature is the provision of individual plug-in stages each mounted on its own miniature frame or subchassis. The plug-in units are received in sockets disposed in the cells on the main chassis through which power connections are made to the individual stages. Filters for isolation of the stages from the power source are provided in the unit.

Another feature consists of spring contacts on the plug-in units arranged to provide wave signal connections between adjoining stages when the units are inserted in the main chassis.

Another feature of the invention is a novel socket construction for making direct-current and power connections to the plug-in stages, wherein each socket is supported on one side by integral projections in its respective cell and is retained on the other side by a removable member common to an entire row of sockets.

Still another feature is a compact, plug-in type of intermediate frequency unit having an improved construction embodying all the essential features of a permeability-aligned intermediate frequency stage. This structure includes a subminiature amplifier tube and extremely small coils.

Other and further objects, features and advantages of the invention will be apparent from a study of the following specification and the accompanying drawings, in which.

Figure 6:
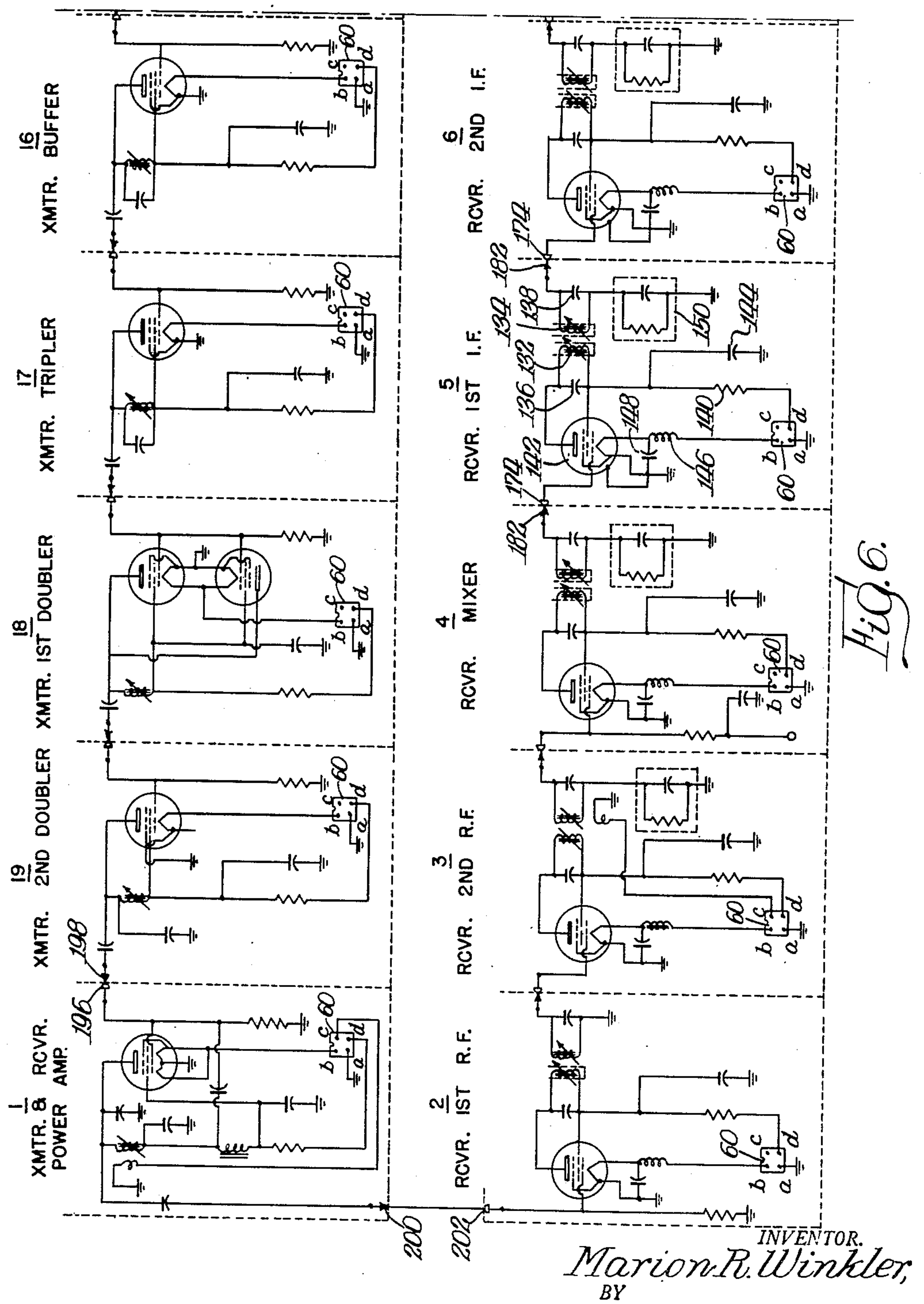
Figure 7:
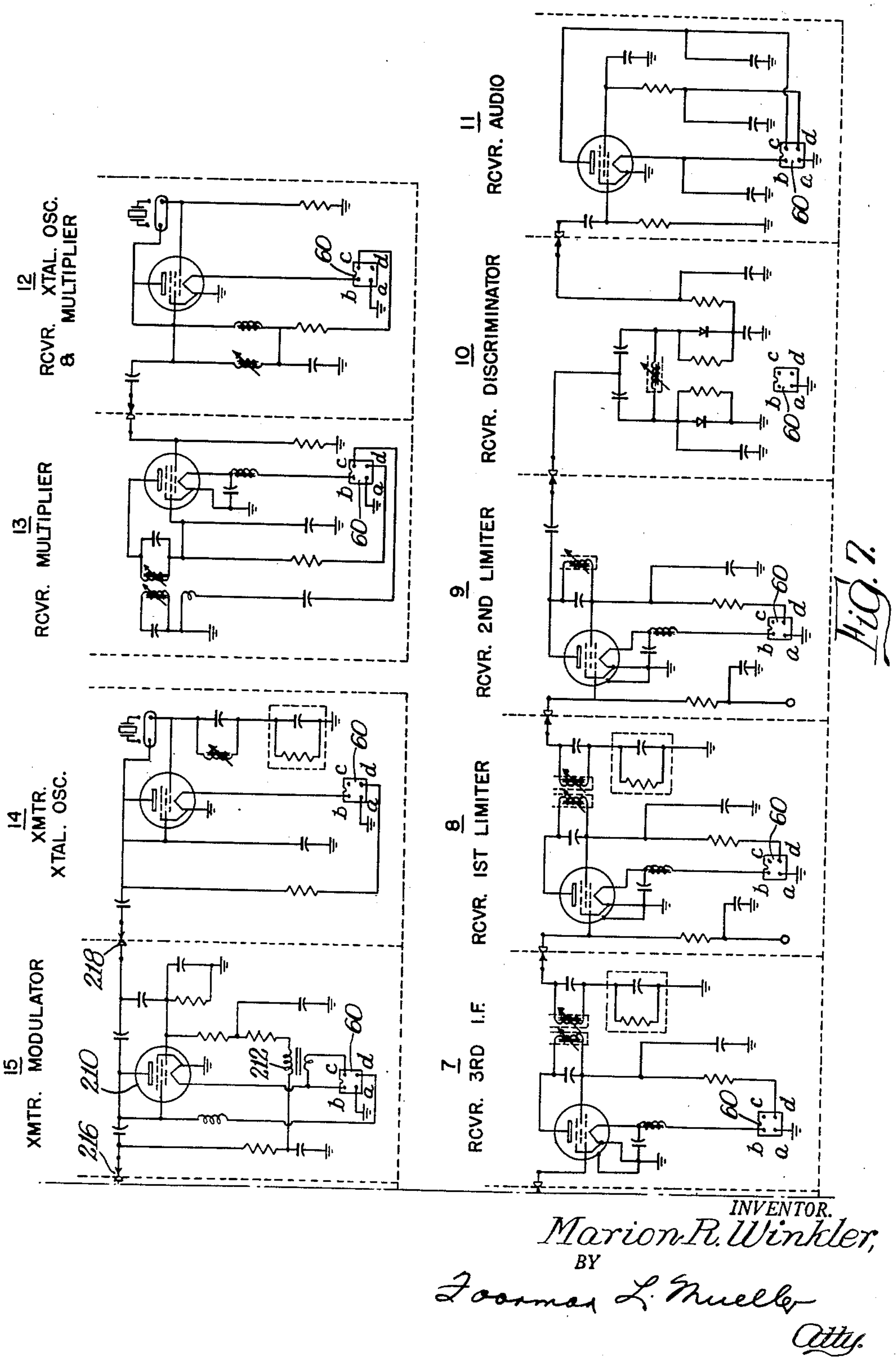

Figs. 6 and 7 together constitute a schematic circuit diagram of the transmitter-receiver.

Figure 8:
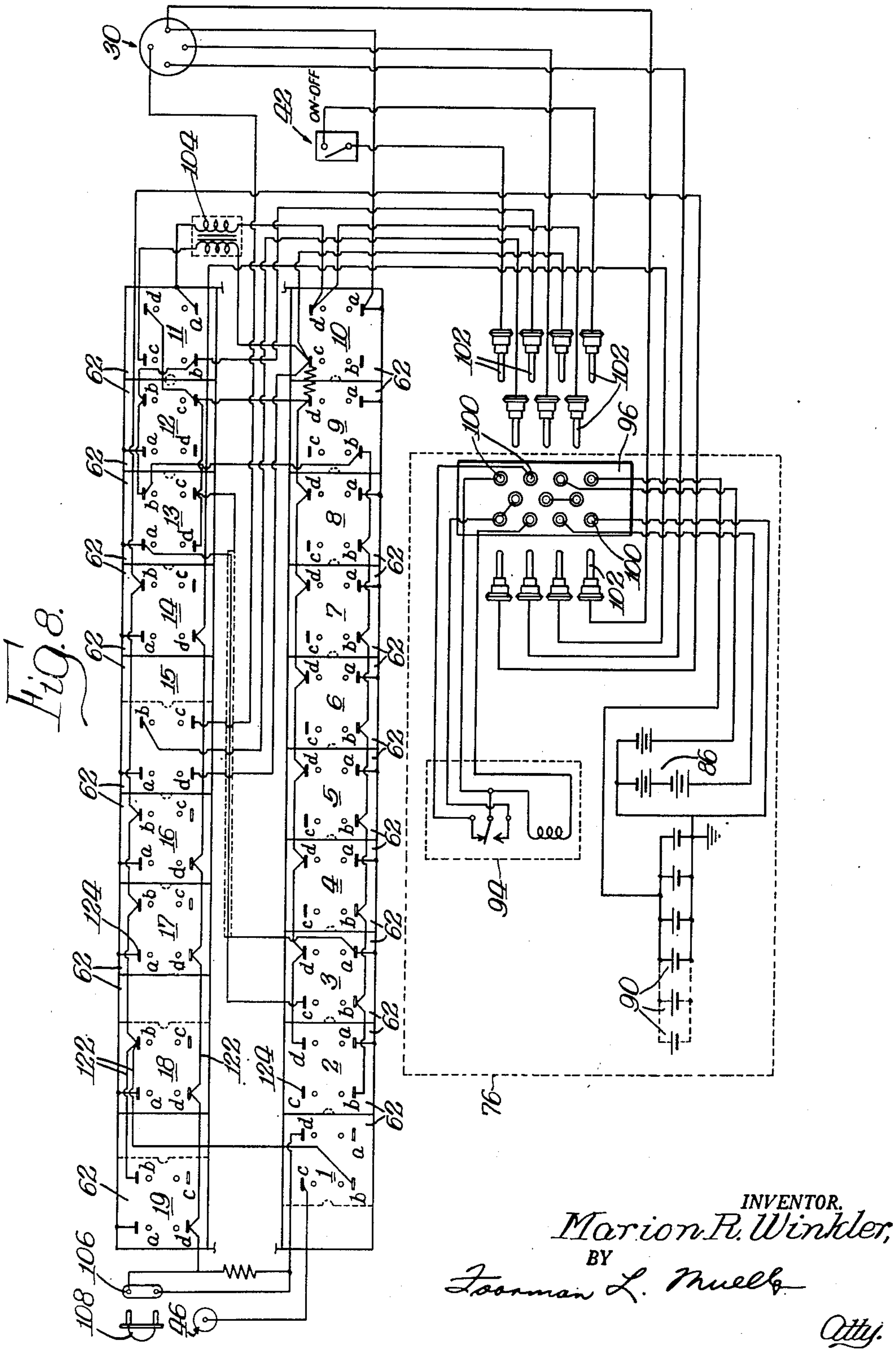
Figures 9, 10, 11, 12, 13:
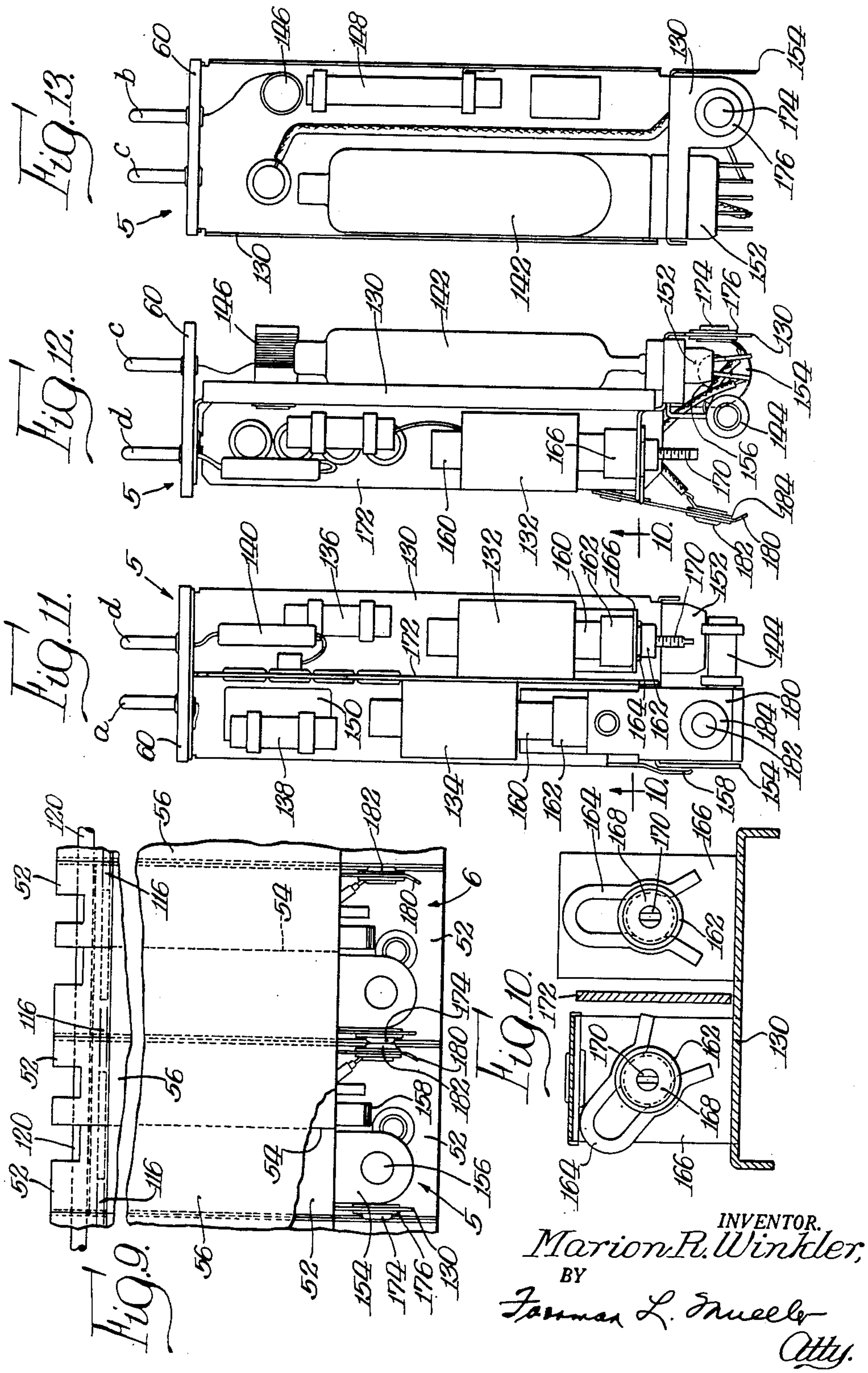
Figures 14, 15, 16, 17:
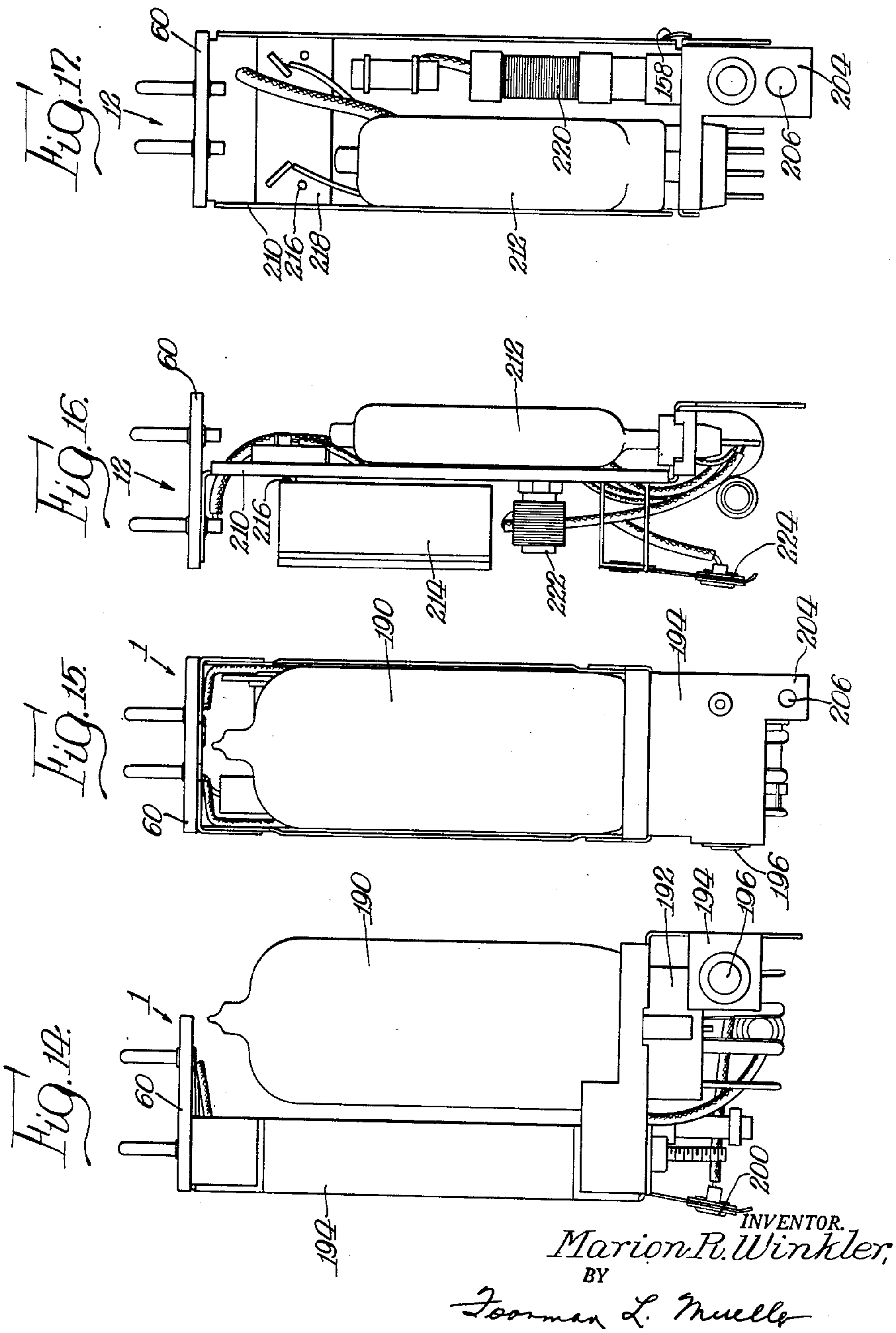

Fig. 8 is a wiring diagram showing various electrical connections as they are related to the sockets and socket terminals of the set;

Fig. 9 is a partial side elevational view of the chassis assembly showing a pair of adjoining cells with plug-in units disposed therein;

Fig. 10 is a partial sectional view of a plug-in unit showing certain coil mountings therein, this section being taken on the line 10—10 in Fig. 11;

Figs. 11 to 13 are elevational views of a typical intermediate frequency plug-in unit employed in the set;

Figs. 14 and 15 are elevational views of a power amplifier plug-in unit; and

Figs. 16 and 17 are elevational views of a crystal oscillator plug-in unit.

In practicing the invention, a honeycomb chassis structure including a plurality of individual cells is formed from highly conductive metal. The individual cells may be arranged in one or more rows and are adapted to receive plug-in units which form the stages of a wave signal translating device. The cells form barriers to prevent direct electrostatic and electromagnetic coupling between stages and the dimensions of the cells are so related to the frequencies involved that they act as wave guides which attenuate these frequencies to thereby isolate the stages in the various cells. Sockets disposed in the cells are held in place between ears provided in the cells and insulating retainer rods passed through apertured lugs in the cell walls. Each plug-in unit comprises components of a particular stage (such as an amplifier, oscillator or other stage) which are mounted on an individual support member, frame or subchassis to which a male plug is secured. These plugs are received in the aforesaid sockets in the cells, and the direct-current and power connections to the various stages are effected through these plugs. The units include filters for isolating the stages from the common power supply. The plug-in units also are provided respectively with spring contacts and mating rigid contacts through which wave signal connections are effected between stages. Each unit is of essentially open construction for easy access to the parts when the unit is out of the chassis. When the unit is in the chassis, it is shielded by the cell wall, which substantially completely encloses the unit on four sides thereof. The intermediate frequency stages are of especially unique construction including one or more permeability-tuned coils for each stage, hairpin mountings for the coil, and an electrostatic barrier between the coils which also serves as an additional mounting member. Other features will become apparent as the description proceeds.

Figure 1:
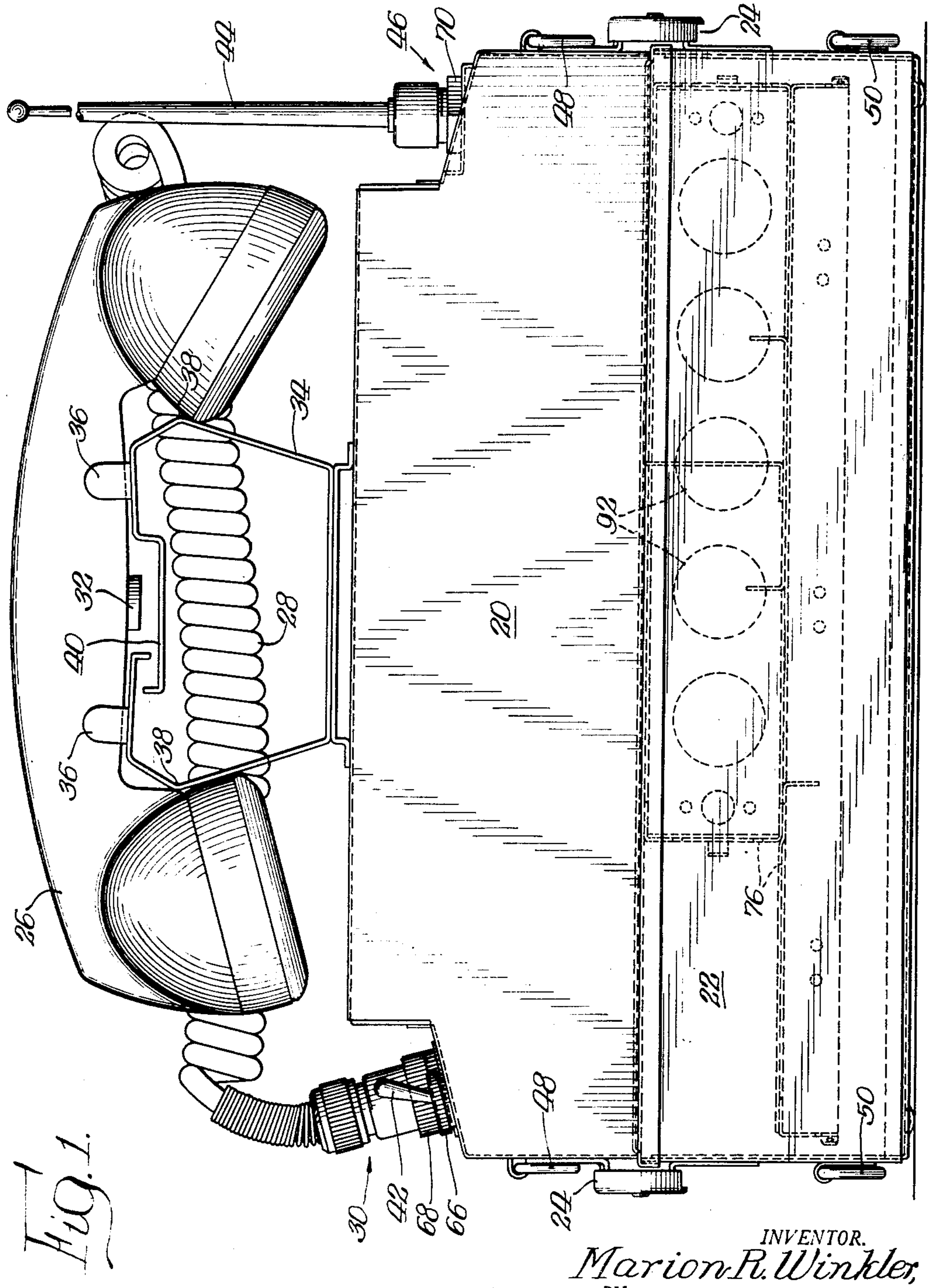
Fig. 1 is a side elevational view of a transmitter-receiver embodying the invention.

Fig. 1 shows, in elevation, a complete transmitter-receiver constructed in accordance with the principles of the invention. The housing of this unit is in two parts consisting of an upper housing 20 and a lower housing 22. These two parts of the housing are held together by releasable locking devices 24. A telephone instrument 26 of the cradle or handset type is employed, being connected by a coiled extensible cord 28 and a conventional connector 30 to the transmitter-receiver. A push button 32 on the cradle 26 is pressed for talking and is released for listening.

An upstanding bracket 34 mounted on top of the housing 20 serves as a combination cradle rest and carrying handle. The bracket 34 is formed from a resilient strip of metal and is provided with retaining fingers 36 and angular portions 38 which yieldingly hold the cradle 26 in place. When one desires to carry the unit, he places the cradle 26 on the rest 34 and grasps with one hand both the cradle 26 and the upper horizontal leg 40 of the handle or bracket 34.

An on-off switch 42 and an antenna 44 are mounted on the upper housing 20. The antenna 44 is provided with a suitable connector 46 so that it may be detached from the transmitter-receiver when not in use. The connector 46 may be a standard coaxial cable connector so that a remote antenna can be used. The antenna circuit may be of proper impedance to match a coaxial line. Belt loops 48 and 50 are provided on the housing parts 20 and 22, respectively, for use when the transmitter-receiver is to be carried as a pack.

Figure 2:
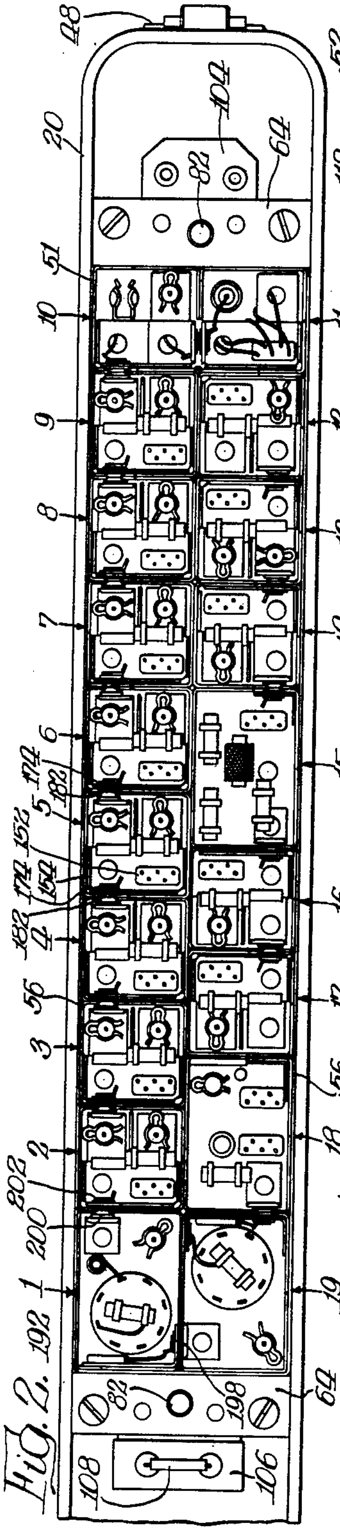
Fig. 2 is a bottom view of a complete chassis assembly mounted in its container.
Figures 3, 4, 5:
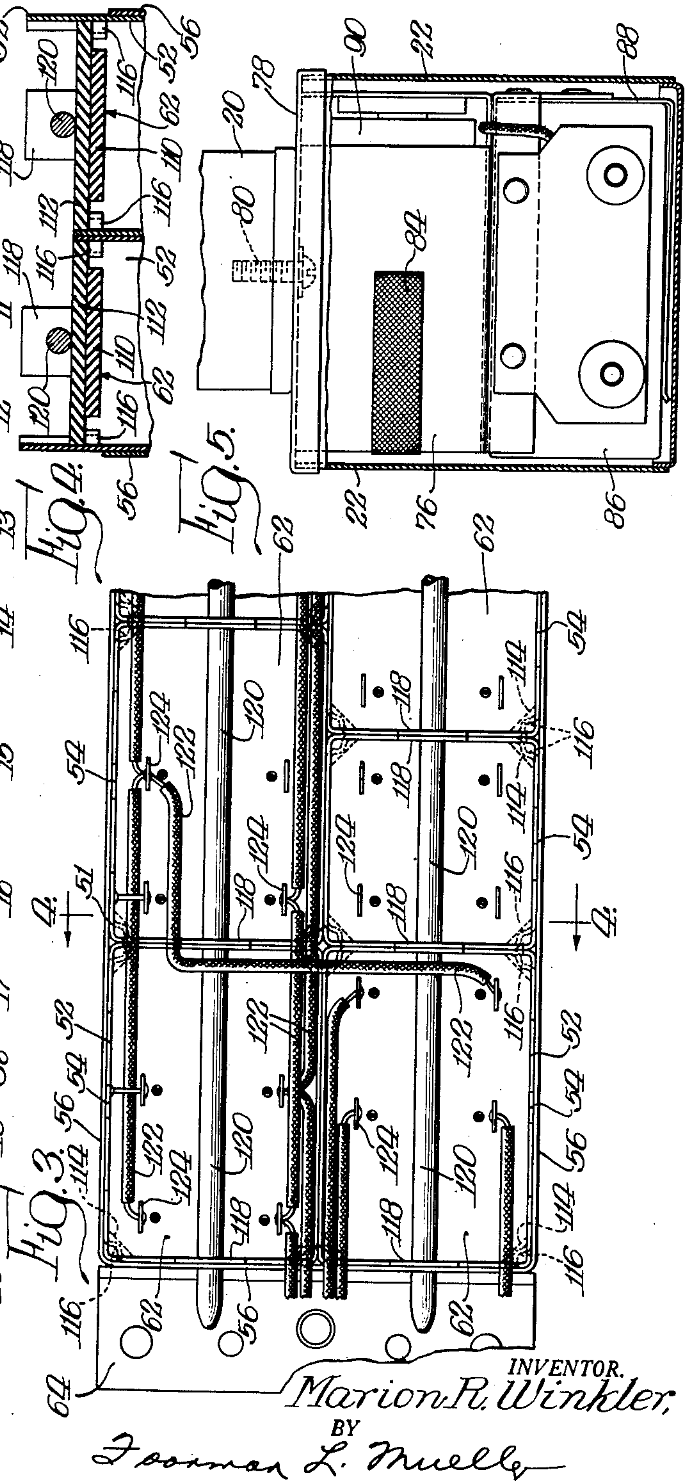
Fig. 3 is a partial plan view looking down at the chassis assembly (without its container), showing the sockets which receive the plug-in stages.
Fig. 4 is a cross section on the line 4—4 in Fig. 3.
Fig. 5 is a fragmentary end view of the transmitter-receiver, with a portion of the battery housing thereof broken away to show the internal parts.

The construction of the honeycomb subchassis of the transmitter-receiver is best shown in Figs. 2, 3 and 9. In the illustrated form of the invention the chassis 51 includes a plurality of cells which consist of rectangular tubes 52 formed of sheet metal and open at both ends. The cells are arranged in two rows as best illustrated in Fig. 2, and are adapted to receive plug-in units or stages numbered 1 to 19, inclusive. The cells in addition to forming direct barriers which prevent undesirable electromagnetic and electrostatic coupling between the various stages, also act as wave guides and the dimensions are such that the frequencies involved are attenuated to a very large extent thereby. The plug-in units or stages are received in sockets 62 in the individual cells as will be more fully explained. Power connections are made to the individual stages through the sockets and individual filters are provided in each unit to isolate the stages from the common power supply.

Referring more particularly to the function of the cells as wave guides, it is known that attenuation of a wave guide below cutoff is of the order of 54.6 decibels per wave length at cutoff frequency measured along the length of the wave guide or cell. In the structure used the cells are approximately ¾ inch across so that the cutoff frequency would be of the order of 10,000 megacycles. The radio transmitter-receiver disclosed would in general be used at frequencies below 200 megacycles and therefore would be well below the cutoff of a wave guide of this size. In a cell ¾ inch square, the attenuation per linear inch long the cell is 36.4 decibels. If a larger cell is used the attenuation per inch is decreased and therefore a longer cell is required for the same attenuation. The above values of attenuation are all for the mode having least attenuation and will be greater for other modes. The main problem in providing shielding in a transmitter-receiver as disclosed is that of shielding the intermediate frequency stages. In the receivers constructed the coils in the intermediate frequency stages are placed at least an inch from the ends of the cells. It is well known that the inductive effect of coils is the principal source of trouble and by so positioning the coils, attenuation of about 40 decibels is provided. Actually the attenuation may be larger because of the small size of the coil and because of orientation to avoid the most objectionable mode. The other components positioned in the wave guide will provide additional attenuation. Inductive effects of components other than coils and capacity effect of all components are of secondary importance and will usually not cause trouble when sufficient attenuation is provided for the coils.

The second main source of interference is through the leads to the common power supply. Separate conductors are required for supplying the filament and plate voltages, and these conductors are connected to all stages. To isolate the stages from the power supply, individual filters are provided in the various stages. Resistor-capacitor filters are provided in the high voltage leads as indicated by resistor 140 and capacitor 144 in stage 5 of Fig. 6. Choke-capacitor filters are provided in the low voltage leads as indicated by choke 146 and capacitor 148 also shown in stage 5 of Fig. 6. Similar filters are provided in the other stages as will be apparent from Figs. 6 and 7.

As gains of the order of one million to one are required for satisfactory operation of a small portable unit as disclosed, the attenuation between stages having high gain, such as output to input stages, must be of this order to prevent undesirable regeneration. Actually the attenuation between stages must be greater than the gain since prevention of oscillation is not enough for satisfactory operation. The attenuation between various cells consists of three parts: (1) Attenuation from the radiating source (such as a coil) to the mouth of the cell in which it is enclosed; (2) Attenuation through space from the mouth of one wave guide cell to the mouth of another cell; and (3) Attenuation from the mouth of the second cell to the component therein which picks up the radiated signal. In the construction disclosed, attenuation of more than 120 decibels has been provided and it is obvious that such attenuation cannot be provided when relying solely on radiation through space. Other known means for producing attenuation are not adaptable for plug-in constructions.

The cellular chassis structure can be provided in many ways. A one piece structure could be provided or one made up of a plurality of parts. In the illustrated form (Figs. 2, 3 and 9), the cells are made of tubes 52 which are rectangularly shaped with a butt seam extending longitudinally on one side thereof. Thus, for example, in the case of the cells which contain stages 5 and 6 (Fig. 9), the tube 52 of each cell has a single vertical seam 54 on its outer side. Each cell is positioned so that seam 54 is disposed adjacent the outer plate 56 which extends along the side of these cells. The various cells are spot welded to each other and to the strap 56 which is of U-shape and embraces the group of cells on three sides thereof, to thereby provide an integral chassis structure. The tubes 54 and strap 56 are made of suitable material such as copper-plated aluminum which is light in weight and readily welded. The various cells are all of one or two standard sizes. As certain stages require much more room than others, it was not practical to make all of the cells the same size.

The reason for disposing all of the seams 54, of the chassis cells (Fig. 9) on the outside of the two rows of cells is to confine all radio frequency creepage through the individual cells to the outside so that plate 56 will prevent unwanted interstage coupling between cells. By radio frequency creepage is meant, the transfer of radiated wave signal energy from one stage to another. Virtually all creepage takes place at the seams and by diverting such creepage to the outer plate or strap 56, it is kept away from the other cells. The plate 56 also helps to shield the set from ground currents.

The various plug-in units or stages of the transmitter-receiver are illustrated schematically in Figs. 6 and 7, and the constructions of several typical plug-in units are shown in Figs. 11 to 17, inclusive. Each of these units is mounted on a male plug 60 adapted to be received in a corresponding socket 62, Figs. 3 and 4, positioned in the respective chassis cell. The particular manner in which these sockets are secured in place will be described presently.

The entire chassis assembly is positioned within the upper housing 20, Figs. 1 and 2, which serves as a container for the chassis. The socket ends of the cells are disposed on top in the normal position of use. An angle bracket 64 is permanently secured to each end of the chassis at the bottom thereof. The chassis structure is suspended within the housing 20 by the various mounting nuts 66, 68 and 70 (Fig. 1), for the on-off switch 42, handset connector 30 and antenna connector 46. The female portions of these connectors are secured to the chassis in any suitable manner.

The battery pack for operating the transmitter-receiver is adapted to be positioned in the lower housing 22. The batteries are carried by a battery case 76, Fig. 5 (shown in dotted outline in Fig. 1) which is welded to and depends from a flanged plate 78 that is adapted to rest on the upper edge of the lower housing 22. Screws as 80 are received in tapped openings 82 (Fig. 2) in the angle brackets 64 for securing the plate 78 and the battery case 76 to the chassis assembly. When the lower housing 22 is unlocked, the battery case 76 may be withdrawn from the housing 22 by lifting the upper housing 20 clear of the lower housing. It is to be noted that a vibrator power supply or a power pack energized from standard power lines may be used for supplying power to the transmitter-receiver instead of the battery pack as illustrated.

The various parts of the battery case are interconnected by braided conductors as 84, Fig. 5, to insure good ground connections at all points, and the battery pack also has a good ground connection with the chassis assembly through the screws 82 and brackets 64. The "B" batteries as 86, Fig. 5, are carried by clips as 88 on the battery case 76. The "A" cells 90 are received in cylindrical holders 92, Fig. 1, also included in the battery case 76. The components of the power supply are shown schematically in Fig. 8 within the dotted rectangle 76, which represents the battery case. In addition to the "A" cells 90 and the "B" batteries 86, the power supply assembly includes a filament changeover relay 94 (controlled by the push button 32, Fig. 1) and a terminal strip 96.

Figs. 6 and 7 illustrate schematically the component parts of the various plug-in units or stages 1 to 19. Detailed descriptions of certain of these units are presented hereinafter, and it will be understood that the same general principles of construction apply to the other units as well. The plugs 60 on which the units are mounted are received in sockets 62, Fig. 8. Corresponding prongs and terminals of the plugs 60 and the sockets 62 are designated by the same reference characters such as *a*, *b*, *c* and *d*.

All direct-current and power connections from the battery pack to the various stages are made through the sockets 62 and plugs 60. Connections from the battery pack to the socket 62 and to the cradle or handset connector 30, as well as to the switch 42, are made through the jacks 100 of the terminal board 96 and the plugs 102 received therein, from which conductors lead to the upper part of the transmitter-receiver unit. In the upper housing 20 of the set there are contained also an output transformer 104 for the receiver audio stage 11 and a meter jack 106 for the power amplifier (stage 1). Normally the jack 106 is closed by a jumper 108. A connection from the antenna connector 46 is made to the terminal *c* of the socket 62 adapted to receive stage 1.

Referring now particularly to Figs. 3 and 4, each of the sockets 62 comprises two layers or sheets of insulating material 110 and 112 secured together. The sheets 110 are beveled at their corners as indicated at 114, Fig. 3, to afford clearance for ears 116 that are punched inwardly from the walls of the various cells. The corners of the insulating sheets 112 of the sockets 62 extend above and are supported by the ears 116. The upper ends of the cell walls 52 have upstanding apertured lugs 118 through which fiber retaining rods 120 are extended across the upper surfaces of the sockets 62 to prevent upward displacement of these sockets. The sockets 62 (that is to say, the sheets 112 thereof) are retained in position by the ears 116 beneath and the rods 120 on top. When it is desired to remove a socket 62 from its cell, the retaining rod 120 is withdrawn and the socket 62 may be lifted. Various electrical conductors 122, Fig. 3, are run along the tops of the sockets 62 and are electrically connected to terminals 124 of the sockets in accordance with the wiring diagram, Fig. 8.

The construction of the intermediate frequency unit 5, Fig. 6 (which is a typical plug-in stage) is illustrated in Figs. 9 to 13, inclusive. In the disclosed embodiment, the overall length of the unit 5 (including the plug prongs *a*, *b*, *c* and *d*) is two and three-quarter inches. The width and thickness of the unit are each three-quarter inch. The unit 5 has a frame or subchassis 130 which is rigidly secured at one end thereof to the plug 60. The various circuit components of the intermediate frequency stage 5 are mounted on and supported by this subchassis. These parts include the primary and secondary intermediate frequency coils 132 and 134, respectively, the primary capacitor 136, the secondary capacitor 138, the plate and screen grid resistor 140, the amplifier tube 142, the screen grid bypass capacitor 144, the filament choke 146, the filament bypass capacitor 148, and a grid leak resistor-capacitor combination 150 that may be of the "printed circuit" type. The tube 142 is of the subminiature type, such as 2E32. The socket 152 for the tube 142 is secured to an extension of the frame 130 of the unit 5.

In its normal position of use within the chassis assembly of the transmitter-receiver, each plug-in unit as 5 is positioned with its plug 60 at the upper end of the cell and the tube socket 152 at the lower end, as shown in Figs. 11, 12 and 13. In Fig. 2, the chassis is shown in inverted position for inserting or removing the plug-in units, and as there shown, the tube sockets are uppermost. The cell wall 52 surrounding the plug-in unit 5 is cut back a short distance on the outer side of this cell and on the two sides which adjoin the cells 4 and 6. The frame 130 of the plug-in unit 5 has a lug or extension 154 (best shown in Figs. 9, 11 and 13) with a hole 156 therein, which lug protrudes beyond the adjoining side of the cell wall 52 and the outer plate 56. When the unit is to be removed from its cell, a hooked implement may be inserted in the hole 156 for pulling the unit from the cell. The unit 5 also has a phosphor bronze spring finger 158 secured to the frame 130 which is adapted to bear against the outer housing 20 when the unit 5 is inserted in its cell, thereby grounding the frame of the unit to the housing.

Inasmuch as the intermediate frequency stages are permeability-aligned, the coils 132 and 134 have adjustable cores or slugs (not shown). The coil windings are stationarily mounted on coil forms 160 within which the slugs are disposed. Each coil form 160 has a cupped holder 162 secured by a hairpin spring or clip 164 (Fig. 10) to a tab or lug 166 which is struck out from the frame 130. The portions of the holder 162 which extends beyond the coil form 160 is of reduced diameter and encloses a small plastic sleeve or washer 168 through which the adjusting screws 170 of the tuning slug extends. These washers 168 serve as lock nuts for the screws 170.

A small brass plate 172, Figs. 10, 11 and 12, is secured to the frame or chassis 130 in perpendicular relation thereto and is interposed between the coils 132 and 134. This plate 172 serves as an electrostatic barrier to prevent stray capacitive coupling between the coils. However, it does not interfere with electromagnetic coupling between the coils. The coils 132 and 134 preferably are provided with outer jackets or shells of low-loss magnetic material such as powdered iron. The plate 172 may also serve as an additional mounting member to support soldered terminals or the like.

Wave signal connections between the various stages are effected through the medium of contacts on the units which slide into engagement with one another when the units are inserted in the chassis. For example, in the case of the unit 5, shown in Figs. 9 to 13, a contact 174 is supported by a rigid extension of the subchassis or frame 130, this contact 174 being mounted on an insulating washer 176. The adjoining plug-in unit 6 likewise is provided with a similar rigid contact 174. These contacts 174 are disposed adjacent the cells 4 and 5, respectively, when the units 5 and 6 are inserted. Contact springs cooperate with these contacts 174. Thus, as shown in Figs. 9, 11 and 12, a spring finger 180 is secured at one end to the frame 130, and a contact 182 is mounted on an insulating washer 184 on this spring 180. The contact 182 mates with the contact 174 in the adjoining cell 6 when the unit 5 is plugged in. The plug-in unit 4 is provided with a similar resilient contact 182 which mates with the rigid contact 174 of the unit 5. Thus, wherever a wave signal connection is provided between two stages in the set, such connection is effected through the combination of a resilient contact and a rigid contact on adjoining plug-in units. These contacts, of course, are clear of the cut-back portions of their respective cell walls, as shown in Fig. 9.

In Figs. 14, 15, 16 and 17, there are presented views of other similar plug-in units. Figs. 14 and 15, illustrate the power amplifier 1 which includes a miniature amplifier tube 190, such as the type 3B4. This is one of the large size plug-in units. A socket 192 for the tube 190 is carried by the frame or subchassis 194 of the unit 1 at one end thereof. The other end of the frame 194 is secured to the plug 60. A rigid contact 196 is mounted on an extension of the frame 194 for cooperation with a flexible contact 198, Figs. 2 and 6, on the adjoining unit 19. A flexible contact 200 on the unit 1 cooperates with the rigid contact 202 on the unit 2. The frame 194 has an ear 204 with a hole 206 therein which may be hooked by an implement for withdrawing the unit 1 from its cell. Further detailed description of the unit 1 is not believed to be necessary in view of the detailed description given above in connection with unit 5. The units are similar as regards the general placement and mounting of the component parts on their respective subchassis.

In Figs. 16 and 17 there is illustrated the receiver crystal oscillator and amplifier 12. This unit includes a chassis 210 on which are mounted a sub-miniature oscillator tube 212 and a crystal unit 214. The crystal unit is of the plug-in type having pins 216 received in a small terminal board 218 of the chassis 210. A movable iron core inductance 220 is provided in the grid circuit and a fixed iron core coil 222 is provided in the plate circuit of the oscillator. The circuit arrangement is illustrated in Fig. 7. A resilient contact 224 is provided on the unit 12 which is adapted to engage a rigid contact on stage 13 to effectively interconnect the stages.

The remaining plug-in units or stages are constructed on the same general principles as those described above. The cells and units are of two sizes, and all except Nos. 1, 15, 18 and 19 are of the smaller size. Each unit has its own subchassis which is mounted on a male plug 60 adapted to be received in one of the sockets 62. Each unit, when inserted in the set is surrounded on four sides by the wall 52 of its cell. These cell walls act as wave barriers between stages, and form wave guides to prevent interference between cells from the ends thereof. Filters are provided to prevent coupling through the common power supply so that all coupling between stages is confined to the cooperating contacts above described. The units are built with a view to ready access for inspection and servicing thereof. Permeability-tuned coils are extensively used in these units and are secured in position by the convenient hairpin mountings shown in Fig. 10. In order to remove a coil from its supporting frame, it is merely necessary to remove the hairpin clip as 164 to release the coil form.

The transmitter-receiver as a whole is small, compact and lightweight. The over-all height of the unit shown in Fig. 1 is about ten inches (not including the antenna), the length is about twelve inches, and the maximum thickness is about three inches. The unit has a very low center of gravity so that it cannot readily be tipped over. This transmitter-receiver has the range and power of a conventional instrument with very much greater dimensions, and its performance both in transmitting and receiving is highly satisfactory.

While a typical embodiment has been illustrated and described herein, this is capable of modification without departing from the principles as set forth hereinabove. It is intended, therefore, that the appended claims shall cover all such modifications as come within the scope of the invention.

I claim:

1. A radio set including a chassis made up of individual cells arranged in a row, each of said cells being of substantially rectangular cross-sectional configuration and comprising a thin metallic wall having a seam on one side and being seamless on its other sides, all of the seams of the several cell walls being disposed on an outer side of the row, radio circuit elements arranged in a plurality of wave signal-handling stages, said stages being respectively disposed within said cells to be shielded thereby, and an electrically conductive plate joined to said cells on the seamed sides thereof.

2. A radio set including a chassis made up of individual cells arranged in two adjoining rows, each of said cells being of substantially rectangular cross-sectional configuration and comprising a thin metallic wall having a seam on one side and being seamless on its other sides, all of the seams of the several cell walls being disposed on the outer sides of the rows, radio circuit elements arranged in a plurality of wave signal-handling stages, said stages being respectively disposed within said cells to be shielded thereby, and an electrically conductive plate joined to each row of cells on the seamed sides thereof.

3. A radio set comprising a chassis made up of individual open-ended elongated cells each bounded by a shielding wall, individual plug-in stages in the radio set, each consisting of radio circuit elements mounted on a male plug and supported at least in part by a metallic frame secured to said plug, sockets respectively secured in said cells at one end thereof, said stages being adapted for insertion into said cells at the opposite ends thereof for seating said plugs in said sockets with said stages enclosed respectively by the cell walls, the metallic frames in at least some of said stages extending generally lengthwise of their cells and dividing the respective spaces bonded by the cell walls to increase the attenuation of radiated energy effected by such walls, and means affording electrical circuit connections between said stages.

4. A radio set including in combination, a chassis including a row of individual rectangular cells each bounded on four sides by a shielding wall and being open at the ends thereof, said shielding wall of each of said cells having a single seam therein on an outer side of said row, an electrically conductive plate bonded to said shielding walls of said cells on said outer side, and a radio circuit including stages provided as individual plug-in units respectively insertable in said cells and shielded thereby, and circuit connectors for establishing electrical connections with said plug-in units.

5. In an amplifier, a chassis having a cellular construction, individual plug-in units respectively adapted for insertion in adjoining cells of said chassis and each defining a particular stage of said amplifier, each of said units being mounted on a metallic subchassis extending generally lengthwise of its cell, and input and output terminals on adjacent units adapted to engage each other as the units are inserted in the cells for electrically interconnecting such units, the walls of said cells being of such configuration to accommodate said terminals and being adapted to substantially prevent transfer of wave signal energy between various stages except through said terminals, at least some of said units having subchassis so disposed that each subchassis divides the space bounded by the surrounding cell walls to increase the attenuation of radiated energy effected by said walls.

6. In an amplifier, a plurality of individually constructed stages each comprising circuit elements mounted on an individual metallic subchassis, a shielding chassis structure comprising a plurality of individual open-ended tubular cells respectively adapted to house said stages, mating contacts on adjacent stages adapted for interengagement to couple the stages together when the same are positioned in said cells, said cells being of such configuration that they act as wave guides to attenuate the radiation of radio frequency energy from the open ends of said cells, with said subchassis extending lengthwise of their respective cells and each being arranged to divide the space within its cell for increasing the attenuation of radiated energy effected by such cell.

7. In a radio set, a cellular chassis comprising individually formed cells arranged in adjoining relation, individual plug-in units respectively adapted for insertion in adjoining cells of said chassis and each defining a separate stage of the radio set, cooperable contact devices on adjacent ones of said units for establishing electrical connections between cells as the plug-in units are inserted therein, said contact devices comprising yielding contact members and cooperating rigid contact members, and members on said units each adapted to receive an implement for withdrawing the respective unit from its cell.

8. In a radio set, a plurality of individually constructed stages each comprising radio circuit elements mounted on an individual subchassis, a shielding chassis structure comprising a plurality of individual cells respectively adapted to house said stages, a socket disposed in each of said cells, a cooperating plug mounted on each subchassis, mating contacts in the respective stages adapted for interengagement to couple the stages together when the same are positioned in said cells, and an apertured portion on each subchassis adapted to be engaged by a hooked implement for withdrawing the respective stages from its cell.

9. A small amplifier, comprising a plurality of high-gain stages each having circuit elements including coils mounted on an individual metallic supporting member, a cellular chassis for housing said stages comprising an individually shielding cell for each stage, each cell having a wall consisting of an open-ended rectangular tube, and provisions in each cell for holding the supporting member of the corresponding stage with its circuit elements substantially entirely surrounded by the cell wall, said supporting member extending lengthwise of its cell and dividing the space bounded by the cell walls to increase the attenuation of radiated energy effected by said walls, said coils being positioned in said cells so that the distance between each coil and an open end of said tube is greater than the dimension of a side of said tube.

10. A small amplifier comprising a plurality of high-gain stages operating at a predetermined frequency, each of said stages including circuit elements and an individual supporting member therefor, a cellular chassis for housing said stages comprising two rows of open-ended rectangular tubes arranged in adjoining relation, each of said tubes being seamless at least on the sides thereof which adjoin other cells, and provisions in each tube for holding the supporting member of the corresponding stage with its circuit elements substantially entirely surrounded by the tube wall, said tubes forming wave guides having a cross section of such dimensions to substantially attenuate signals of said predetermined frequency.

11. In a transmitter-receiver, an outer housing, a plurality of open-ended rectangular tubes bonded together in adjoining relation to provide a cell structure, each of said tubes being seamless on three sides thereof and having a single seam on the fourth side which does not adjoin any other tube, a metallic plate bonded to the seamed sides of all said tubes, and a plurality of plug-in stages of the transmitter-receiver operating at various frequencies and respectively adapted for insertion in said tubes, said tubes forming wave guides having such dimensions that the cut off frequency thereof is substantially higher than the frequency of operation of said stages.

12. In a radio set which has a main chassis structure divided into a plurality of individual cells each having a shielding wall, a plug-in unit adapted for insertion in a chassis cell and comprising an individual subchassis of elongated configuration, a male plug mounted on one end of said subchassis, an electron tube socket mounted on the other end of said subchassis in longitudinally spaced relation to said plug for supporting an electron tube intermediate the ends of said subchassis, and a plurality of electrical circuit elements mounted on said subchassis, all said parts being confined in an elongated space having a maximum width that does not exceed the width of said plug.

13. A plug-in unit as set forth in claim 12, wherein said plug is adapted to effect direct-current and power connections to the plug-in unit, said unit also including contacts adapted for cooperation with corresponding contacts in adjoining plug-in units for effecting wave signal connections between units.

14. In a high-gain receiver having a chassis structure provided with individual sihelding cells for the various receiver stages, an intermediate frequency unit of the plug-in type adapted to be inserted in a chassis cell, said unit comprising a plug connector, a metallic mounting member secured to said connector, a wave signal amplifying device supported by said mounting member, two permeability aligned intermediate frequency coils supported by said mounting member, and an electrostatic barrier secured to said mounting member and interposed between said coils, said mounting member and said barrier being of elongated configurations and extending lengthwise of the chassis cell to divide the space bounded by the cell walls and thereby increase the attenuation of radiated energy effected by said walls.

15. In a high-gain receiver having a chassis provided with individual shielding cells for the various stages, an intermediate frequency unit of the plug-in type adapted to be inserted in a chassis cell, said unit comprising a plug-in connector, a metallic mounting member secured to said connector, a socket for a subminiature amplifier tube secured to said mounting member, a pair of intermediate frequency coils each having an adjustable core and an outer jacket composed of low-loss magnetic material, said coils being positioned substantially in side-by-side relation, and an electrostatic barrier plate between said coils secured to said mounting member, said mounting member and said barrier plate being of elongated configurations and extending lengthwise of the chassis cell to divide the space bounded by the cell walls, thereby increasing the attenuation of radiated energy effected by said walls.

16. A plug-in intermediate frequency unit as set forth in claim 15, including a plurality of radio circuit elements supported by said mounting member, said barrier plate serving as an additional mounting member for certain of said elements.

17. In an amplifier, a plurality of individually constructed stages each comprising circuit elements mounted on an individual subchassis, a shielding chassis structure comprising a plurality of individual cells respectively adapted to house said stages, a socket disposed in each of said cells having connections to power supply means, a cooperating plug mounted on each subchassis, mating contacts on adjacent stages adapted for interengagement to couple the stages together when the same are positioned in said cells, and filters in said stages for isolating said radio circuit elements from said power supply means, said cells and said filters being effective to substantially prevent transfer of radio frequency energy between various stages except through said mating contacts.

18. In a high gain amplifier having a chassis structure provided with individual shielding cells for the various stages thereof, an alternating current amplifier stage comprising a plug-in unit adapted to be inserted in a chassis cell, said unit including a plug connector, a metallic mounting member secured to said connector, a wave signal amplifying device supported by said mounting member, two permeability aligned coils supported by said member, and an electrostatic barrier secured to said mounting member and interposed between said coils, said mounting member and said barrier being of elongated configurations and extending longitudinally of the chassis cell in such relation thereto as to divide the space bounded by the cell walls, thereby increasing the attenuation of radiated energy effected by the cell walls.

19. A high-frequency, high-gain amplifier comprising a chassis structure having a plurality of open-ended cells immediately adjoining each other, a plurality of plug-in units each constituting a complete stage of the amplifier and being respectively adapted for insertion into said cells, and circuit connectors for establishing electrical circuit connections among the several units when the same are received in the cells, each of said units consisting of miniature amplifier circuit components mounted in compact relation on a small metallic frame, and each of said cells constituting a wave guide having walls in close proximity to and surrounding the components of its respective plug-in unit, said units and said cells having such dimensions that the radiant energy which originates in the cells is greatly attentuated.

20. In an amplifier having a power supply, the combination comprising a plurality of individual plug-in units each constituting a complete stage of the amplifier and having a plug thereon, a shielding chassis structure composed of a plurality of individual cells respectively adapted to house said units, each of said cells having therein a socket with connections to the power supply for receiving the plug of its respective plug-in unit, and filters in said units for isolating said stages from the power supply insofar as alternating currents are concerned.

21. A radio set comprising a chassis made up of individual open-ended cells each having at one end thereof projections integral with the cell wall, sockets for said cells each having an inner face thereof seated against the projections at the end of its cell, a common retaining member extending across the outer faces of said sockets, provisions on said chassis for holding said retaining member in place, and plug-in stages respectively adapted for insertion into said cells through the other ends thereof, each of said stages having a plug receivable in the corresponding socket.

MARION R. WINKLER.

REFERENCES CITED

The following references are of record in the file of this patent:

UNITED STATES PATENTS

| Number | Name | Date |
|---|---|---|
| 1,654,296 | Loewe | Dec. 27, 1927 |
| 1,875,132 | Peterson | Aug. 30, 1932 |
| 2,213,328 | Schaper | Sept. 3, 1940 |
| 2,268,619 | Reid | Jan. 6, 1942 |
| 2,272,066 | Peterson | Feb. 3, 1942 |
| 2,388,848 | Howe | Nov. 13, 1945 |

FOREIGN PATENTS

| Number | Country | Date |
|---|---|---|
| 112,246 | Austria | Dec. 30, 1940 |

OTHER REFERENCES

Tele-Tech Magazine, Oct. 1947, page 57, article entitled "Here's the All Plug-In-Receiver."